UNITED STATES PATENT OFFICE.

ISAAC RECKHOW AND WILLIAM H. STAFFORD, OF BROOKLYN, NEW YORK.

IMPROVEMENT IN PROCESSES OF PREPARING PICKLES.

Specification forming part of Letters Patent No. 164,659, dated June 22, 1875; application filed May 17, 1875.

*To all whom it may concern:*

Be it known that we, ISAAC RECKHOW and WILLIAM H. STAFFORD, of Brooklyn, in the county of Kings and State of New York, have invented an Improvement in the Process of Preparing Pickles, of which the following is a specification:

In preparing gherkins it is usual to put them into brine, and afterward to color them by sulphate of copper, which is unwholesome.

Our process has for its object the coloring of the pickles with a brownish hue without the use of any material that is the least unwholesome, and at the same time the color is permanent and the pickle crisp.

We wash the pickles in two or three waters after taking them out of the brine, so as to extract as much of the salt as possible, and also the soluble matter of the rind of the cucumber, that is objectionable if it is allowed to remain. The gherkins are then immersed in water containing about two pounds of alum to forty gallons, and heated, by steam preferably, for about half an hour, and then the pickles are allowed to remain in this water about twenty-four hours. Whisky vinegar is mixed with saccharine coloring matter composed of burnt sugar, burnt molasses, or the article known as India soy. This coloring matter is used in about the proportion of one gallon to eighty gallons of vinegar, and either of the ingredients named may be used, or a mixture of them, according to the depth of the brown color desired for the pickles. The gherkins are removed from the alum-water and allowed to soak in the colored vinegar until they assume the desired hue, and they are then removed and placed in vessels containing any kind of vinegar.

By this method of preparing pickles, the color desired for rendering the gherkins salable is obtained, there is not any deleterious substance employed, and the flavor and consistency of the pickle are improved.

We claim as our invention—

The process of preparing pickles by first salting and washing them, then soaking them in alum solution, and finally coloring by saccharine matter in vinegar, substantially as described.

Signed by us this 7th day of May, A. D. 1875.

ISAAC RECKHOW.
  WILLIAM H. STAFFORD.

Witnesses:
  GEO. D. WALKER,
  GEO. T. PINCKNEY.